United States Patent
Kamiji et al.

(10) Patent No.: US 6,846,008 B2
(45) Date of Patent: Jan. 25, 2005

(54) AIR BAG SYSTEM

(75) Inventors: Kouichi Kamiji, Saitama (JP); Hitoshi Higuchi, Saitama (JP); Nobuyuki Kawamura, Saitama (JP); Kenichi Saito, Saitama (JP); Tomoyuki Okumura, Saitama (JP)

(73) Assignees: Honda Giken Kogyo Kabushiki Kaisha, Tokyo (JP); TS Tech Co., Ltd., Asaka (JP)

( * ) Notice: Subject to any disclaimer, the term of this patent is extended or adjusted under 35 U.S.C. 154(b) by 34 days.

(21) Appl. No.: 09/996,153

(22) Filed: Nov. 28, 2001

(65) Prior Publication Data

US 2002/0063416 A1 May 30, 2002

(30) Foreign Application Priority Data

Nov. 28, 2000 (JP) ........................................ 2000-361814

(51) Int. Cl.[7] ............................................... B60R 21/24
(52) U.S. Cl. ...................................... 280/729; 280/730.1
(58) Field of Search ............................. 280/728.1, 729, 280/730.1, 732, 740

(56) References Cited

U.S. PATENT DOCUMENTS

| 4,290,627 | A | * | 9/1981 | Cumming et al. | .......... 280/729 |
|---|---|---|---|---|---|
| 5,306,043 | A | * | 4/1994 | Mihm et al. | ................. 280/732 |
| 5,573,270 | A | * | 11/1996 | Sogi et al. | .................... 280/740 |
| 5,584,508 | A | * | 12/1996 | Maruyama et al. | ....... 280/743.1 |
| 5,613,348 | A | * | 3/1997 | Lunt et al. | ..................... 53/429 |
| 5,613,698 | A | * | 3/1997 | Patercsak et al. | ......... 280/728.1 |
| 5,626,358 | A | * | 5/1997 | Ricks et al. | ................. 280/731 |
| 5,632,506 | A | * | 5/1997 | Shellabarger | ............ 280/743.1 |
| 5,931,498 | A | * | 8/1999 | Keshavaraj | ............... 280/743.1 |
| 6,042,181 | A | * | 3/2000 | Goor | ..................... 297/216.11 |
| 6,089,599 | A | * | 7/2000 | Schimmoller et al. | ...... 280/740 |
| 6,109,649 | A | * | 8/2000 | Adomeit et al. | ............ 280/740 |
| 6,164,696 | A | * | 12/2000 | Ellerbrok et al. | |
| 6,250,668 | B1 | * | 6/2001 | Breed et al. | ............. 280/730.2 |
| 6,375,219 | B2 | * | 4/2002 | Keshavaraj | ............... 280/743.1 |
| 6,378,898 | B1 | * | 4/2002 | Lewis et al. | ................. 280/733 |

FOREIGN PATENT DOCUMENTS

GB 2270834 * 3/1994

* cited by examiner

*Primary Examiner*—Ruth Ilan
*Assistant Examiner*—Toan To
(74) *Attorney, Agent, or Firm*—Carrier, Blackman & Associates, P.C.; Joseph P. Carrier; William D. Blackman

(57) ABSTRACT

In an air bag system in which an air bag is placed under an upper surface of an instrument panel for restraining a passenger by igniting an inflator by a signal from an acceleration sensor when a vehicle is crashed and deploying the air bag with gas generated by the ignition of the inflator, a method for forming a pocket in a lower surface of the air bag when it is inflated.

22 Claims, 4 Drawing Sheets

AIR BAG SYSTEM

BACKGROUND OF THE INVENTION

1. Field of the Invention

The present invention relates to an air bag system in an instrument panel in front of a front occupant seat.

More particularly, the air bag system can inflate to a designed inflation, even if there exists an obstacle near the instrument panel for restraining an occupant at a front seat. The present invention can provide less impact to the obstacle and maintain the occupant restraining performance, even if there exists no obstacle.

2. Description of the Related Art

The known air bag system includes a folded air bag housed in a storing portion, which is provided in an instrument panel in front of a front passenger seat. The air bag is inflated and inflated toward an occupant quickly by introducing high-pressure gas into the air bag, when a vehicle is crashed for restraining the forward movement of the occupant, which is caused by the inertia force.

The air bag needs to be inflated smoothly in case that an obstacle is near the instrument panel. For example, the obstacle is a child safety seat facing rearward relative to an inflating direction of the air bag. Even if the air bag is brought into contact with the obstacle while the air bag is being inflated, the impact imparted to the obstacle by the air bag needs to be reduced. After the air bag is inflated, the configuration of the air bag needs to remain stable.

To cope with this, the following related methods have been used: (a) the air bag is inflated to avoid as much as possible a risk of contact with the obstacle in the inflating direction of the air bag by improving the method of housing the air bag; and (b) the configuration of the air bag is improved so as to avoid the contact with the obstacle when the air bag is inflated.

However, with the method under (a) there exist problems. One such problem is that the load inputted relative to the windshield becomes large when the air bag is inflated. A second problem is that the air bag is not inflated to the designed configuration due to the obstacle, whereby the passenger rest raining performance is deteriorated. With the method under (b) there exist problems. One such problem is that the designed passenger restraining performance is deteriorated by the varied configuration after the inflation of the air bag.

SUMMARY OF THE INVENTION

It is an object of the invention that an air bag system, which may eliminates the problems in the related art, is provided. The above-mentioned object can be achieved by inflating the air bag with a designed inflating configuration to restrain an occupant, even if there exists an, obstacle near the instrument panel. Such an inflating configuration provides less impact to the obstacle and maintains a designed passenger restraining performance even if there exists no obstacle.

As a result of intensive studies to attain the object, the inventors have come to a conclusion that the aforesaid problems may be solved by an air bag system, comprising:

an air bag for placement in a folded state under an upper surface of an instrument panel, and for being inflated by an inflator, which is ignited by the signal from the acceleration sensor, when a vehicle is crashed, wherein the air bag has a pocket disposed at a lower surface of the air bag when the air bag is inflated.

Moreover, in the air bag system hereof, the pocket is located in a position corresponding to a top portion of a child safety seat when the air bag is inflated.

In the air bag system, it is preferable that the location of the pocket corresponds to the location of atop portion of a child safety seat fixed as facing rearward of the vehicle. Since the top portion of the child safety seat is accommodated in the pocket, the impact that would be imparted to the child safety seat can be relaxed appropriately. And the air bag can be inflated to the designed inflating configuration for restraining the occupant. It is preferable that the pocket is recessed when the air bag is inflated.

In the case that the pocket is designed as the recessed type, the pocket may be fixed to the inside of the upper surface of the air bag with a strap.

DETAILED DESCRIPTION OF THE PREFERRED EMBODIMENTS

An air bag system according to the invention will be described in detail be low with reference to the attached drawings.

Figure 1:
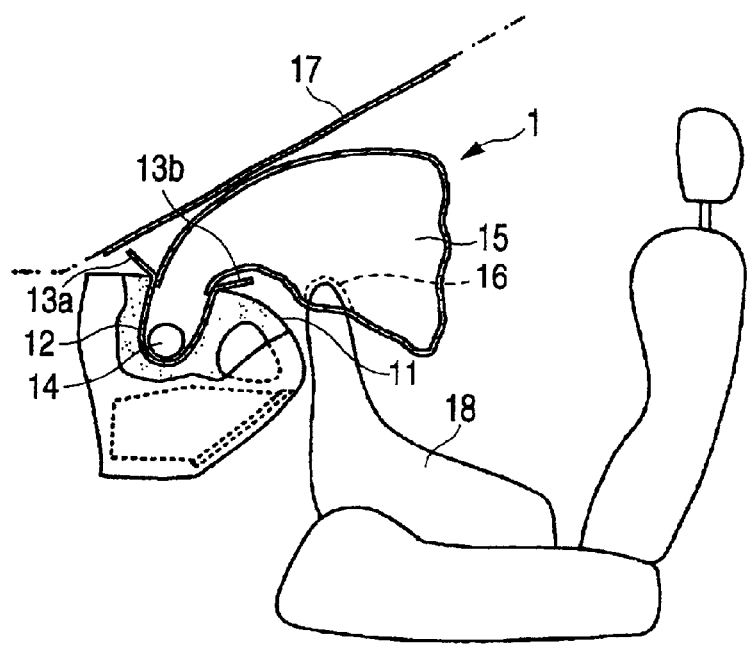
FIG. 1 is a cross-sectional view of a front passenger seat showing how an air bag according to an air bag system of the invention is inflated.

FIG. 1 is a cross-sectional view showing an example of the air bag system according to the invention which is in a inflating process. In this example of the air bag system, a child safety seat is mounted in a front passenger seat as facing rearward as an obstacle.

In FIG. 1, the air bag system 1 is housed in an upper portion of an instrument panel 11. The air bag system 1 comprises: an airtight container-like retainer which opens to an upper surface of the instrument panel 11; and lids 13a and 13b which close an upper end opening portion of the retainer 12.

An inflator 14 and an air bag 15 are housed in the interior of the retainer 12. Namely, the interior of the retainer 12 constitutes a housing portion of the air bag in the interior of the retainer 12. The inflator 14 is a container which includes a gas generating agent such as gun powder, and a gas generating agent ignited when a crash of a vehicle is detected through a deceleration of the vehicle. From the gas generating agent, high-pressure gas is rapidly expelled by igniting. In addition, the air bag 15 is a bag which opens at one end thereof. And the air bag 15 is joined airtight in such a manner that gas generated by the inflator is allowed to flow into the air bag 15.

When the vehicle is decelerated abruptly due to a crash or the like the deceleration of the vehicle is detected by an acceleration sensor or the like, and the gas generating agent in the inflator 14 is ignited, whereby a high-pressure gas is rapidly expelled from the inflator 14, and the air bag 15 is pressed against the lower surfaces of the lids 13a and 13b. The lids 13a and 13b then rotate upwardly to thereby open the upper end opening in the retainer 12, and the air bag 15 is inflated through the opening.

While a child safety seat 18 is fixed in a front passenger seat as facing rearward of the vehicle, since a top portion of the child safety seat 18 is accommodated at the position corresponding to the position of a pocket 16 formed in the air bag, the air bag is allowed to be inflated smoothly, without interference from the child safety seat.

The air bag 15 is made of an airtight and soft material such as a woven fabric of nylon. It is preferable that the air bag is formed into a bag-like configuration using polyamide yarns. In addition, it is preferable that heat-resistant rubber or silicone is coated on the inner side thereof.

The pocket 16 is preferably housed in the inside of the air bag, when the air bag 15 is housed within the retainer 12.

Figure 2:
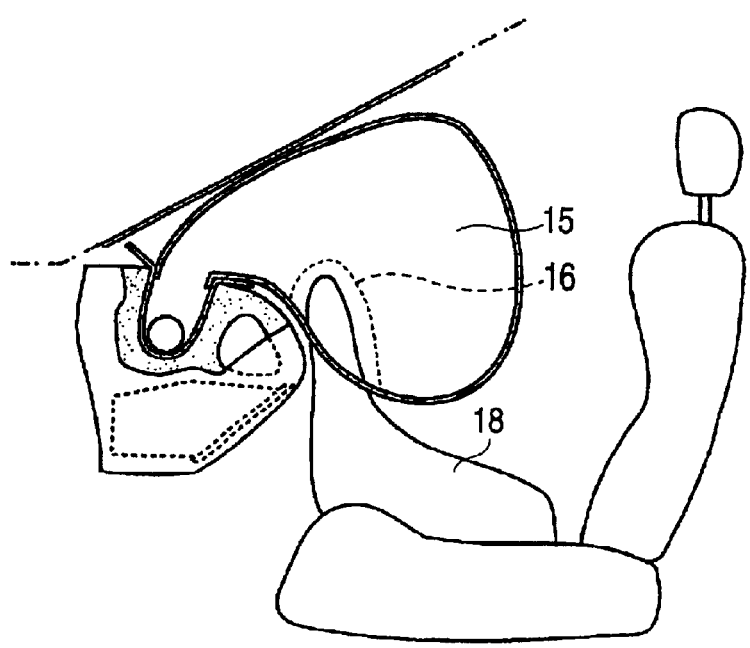
FIG. 2 is a cross-sectional view of a front passenger seat showing how an air bag according to an air bag system of the invention is inflated to the full extent.

FIG. 2 is a cross-sectional view showing a state in which the air bag is inflated to the full extent. Since the top portion of the child safety seat 18 is fully accommodated in the pocket 16 formed in the air bag 15, the air bag 15 can retain the designed configuration thereof. In addition, since the top portion of the child safety seat 18 is accommodated in the pocket 16, the impact that would be imparted thereto when the air bag 15 is brought into contact with the child safety seat 18 is reduced. In addition, since the air bag 15 can take the designed configuration even if there exists no obstacle, the passenger restraining performance thereof can be maintained.

The pocket comprises a pocket bag portion and a pocket opening.

There is no limitation to the configuration of the pocket bag portion. A first configuration, for example, is formed in narrowing shape from the pocket opening toward a bottom portion of the pocket bag portion. A second configuration, for example, is formed in a cylindrical shape, and the shape of the bottom portion of the pocket bag portion is similar to the pocket opening. To be specific, taken for other examples are such configurations as a semi-cylindrical configuration, a cylindrical configuration with circular bottoms, a conical configuration, a rectangular prism-like configuration and a semi-oval configuration. In addition, it is preferable that the depth of the pocket bag portion be 5 to 30 cm when the air bag is inflated to the full extent.

It is not preferable that the pocket depth is less than 5 cm, because it would have little effect in protecting the obstacle. It is not preferable that the size of the air bag needs to be enlarged, such as if the depth thereof is more than 30 cm.

While there is no limitation to the configuration of the pocket bag portion, slit-like, circular, rectangular and oval configurations are preferable. The pocket opening may be sized such that the top portion of a child safety seat is allowed to be accommodated in the air bag when the air bag is inflated. The area thereof is preferably in the range from 450 to 900 $cm^2$ when the air bag is inflated.

It is preferable that the pocket is located at a position corresponding to the location of the top portion of the child safety seat facing rearward of the vehicle, whereby an obstacle such as the top portion of the child safety seat can be protected smoothly when the air bag is inflated.

In addition, a material of the pocket bag portion may be the nylon woven fabric, which is similar to the material of the air bag. One other suitable material may be rubber, which has flexibility.

It is preferable that a pocket bag portion is made as a separate component, which is joined to the air bag to produce a pocket. The air bag includes a pocket opening in a lower panel of the air bag to make a pocket. Thereafter, the mouth portion of the pocket opening is joined to the mouth portion of the pocket bag portion. The joining method for connecting the mouth portions together can be implemented through a sewing method, a bonding method through thermal fusion, or an adhesive method. However, the sewing method is preferable to join the mouth portions together. A polyamide suture is preferably used for the sewing method. In addition, joining or sewing a plurality of panels together according to the configuration thereof may produce the pocket bag portion.

An example of the air bag according to the invention will be described with reference to the attached drawings.

Figure 3:
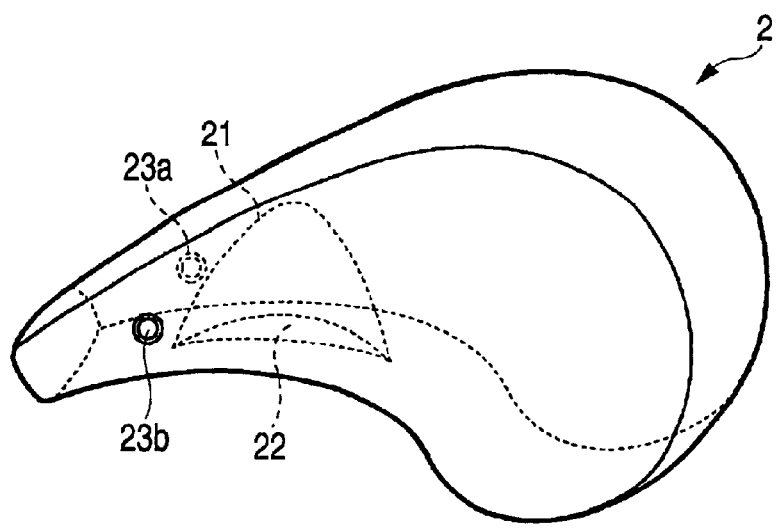
FIG. 3 is a perspective view showing an air bag according to a first embodiment of the invention.

FIG. 3 is a perspective view showing an example of an air bag in which a recessed type pocket is formed therein when the air bag is inflated to the full extent. As shown in FIG. 3, the recessed type pocket denotes a pocket which is formed in such a manner as to enter the air bag when the air bag is inflated. The pocket of the air bag 2 comprises a longitudinal slit-like pocket opening 22 relative to a direction in which the air bag is inflated and a pocket bag portion 21 which is constructed by sewing two angled panels together. The pocket can be produced by forming the slit-like pocket opening 22 in a lower panel of the air bag and sewing together the mouth portion of the pocket opening portion 22 and the mouth portion of the pocket bag portion 21.

Furthermore, a vent hole (an exhaust hole) is preferably formed in the air bag for exhausting gas.

The impact that would be caused when the top portion of the child safety seat enters the pocket to be accommodated therein can be relaxed quickly by forming the vent hole in a side of the air bag in the vicinity of the pocket.

In this air bag 2, as shown in FIG. 3, vent holes 23a and 23b are formed in both sides of the air bag in the vicinity of the pocket.

Figure 4:
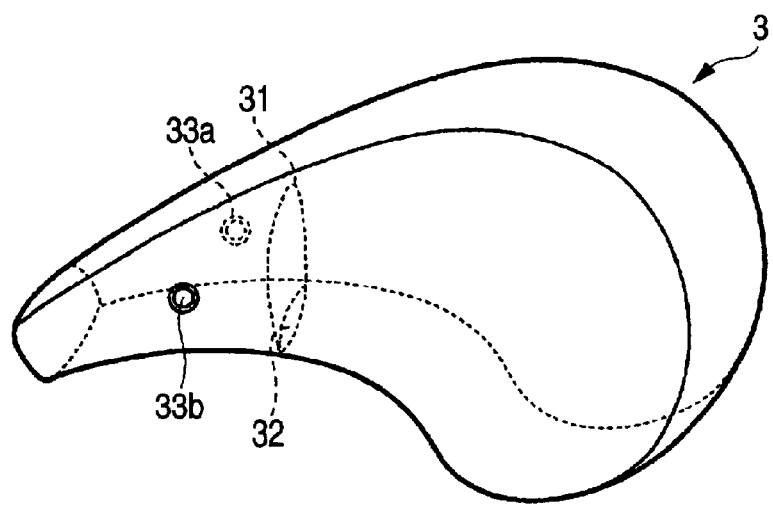
FIG. 4 is a perspective view showing an air bag according to another embodiment of the invention.

FIG. 4 is a perspective view showing another example of an air bag in which a recessed type pocket is formed therein when it is inflated to the full extent. The pocket of the air bag 3 comprises a transverse slit-like pocket opening 32 formed relative to a direction in which the air bag is inflated and a pocket bag portion 31 which is constructed by sewing together two semi-cylindrical panels. The pocket can be produced by forming the slit-like opening 32 in the lower panel of the air bag and sewing together the mouth portion of the slit-like opening 32 and the mouth portion of the pocket bag portion 31.

Since the air bags are inflated with the slit-like pockets 22 and 32 remaining closed in a case where there exists no obstacle, the passenger restraining performance equivalent to that of the air bag with no pocket can be provided.

On the contrary, in case there exists an obstacle, since the pocket openings 22 and 32 are opened to accommodate therein the obstacle, the air bag can be inflated to the designed inflating configuration to restrain the passenger while the impact to the obstacle can be relaxed appropriately.

Figure 5:
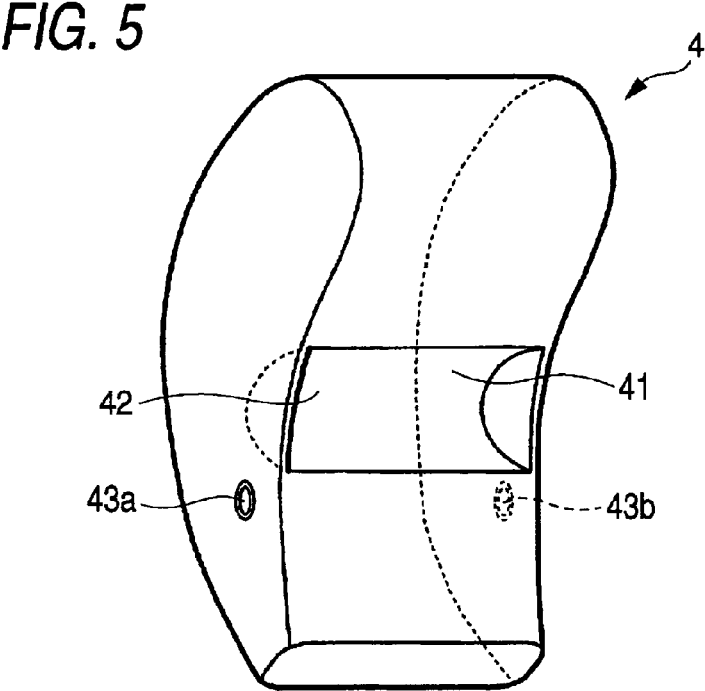
FIG. 5 is a perspective view showing an air bag according to a further embodiment of the invention.

FIG. 5 is a perspective view of an example of an air bag in which a recessed type semi-cylindrical pocket is formed in the air bag when it is inflated to the full extent. The pocket of the air bag 4 can be produced by forming a rectangular pocket opening 42 in the lower panel of the air bag and sewing a rectangular panel 41 to longer sides of the pocket opening 42 and both side panels as shown in FIG. 5.

Figure 6:
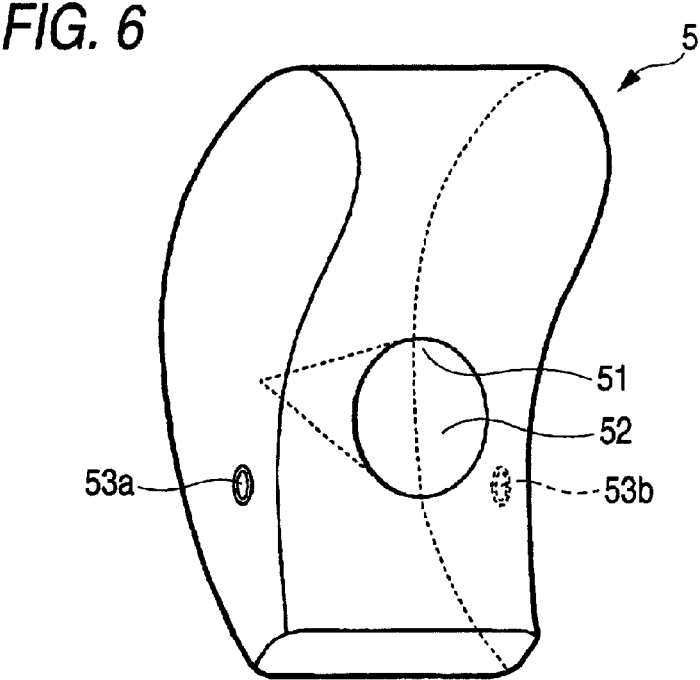
FIG. 6 is a perspective view showing an air bag according to still another embodiment of the invention.

FIG. 6 is a perspective view showing another example of an air bag in which a recessed type pocket is formed in the air bag when it is inflated to the full extent. The pocket of the air bag 5 comprises a circular pocket opening 52 and a pocket bag portion 51 which is formed into a conical configuration. The pocket can be produced by forming the circular opening 52 in the lower panel of the air bag and sewing the mouth portion of the circular opening 52 and the mouth portion of the pocket bag portion 51 together.

Figure 7:
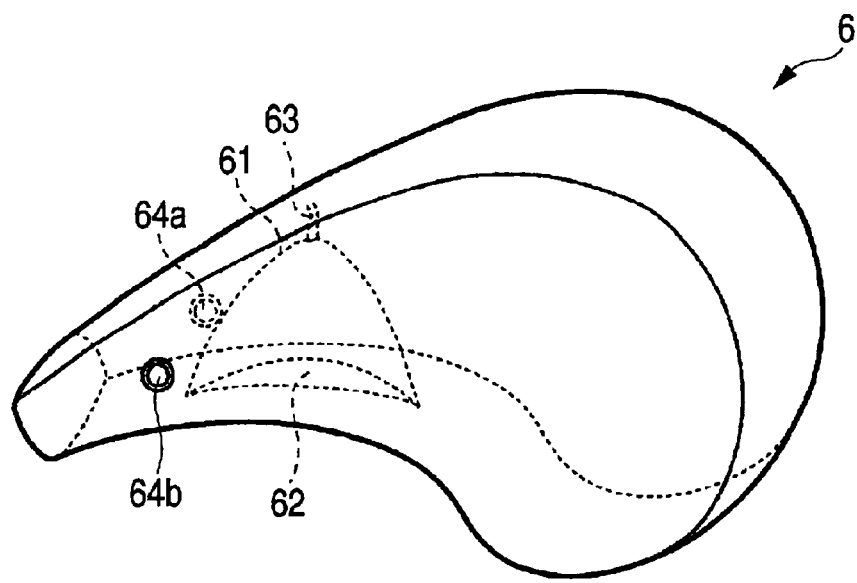
FIG. 7 is a perspective view showing an air bag according to yet another embodiment of the invention.

In addition, in the case of the recessed type pocket, it is preferable to fix the pocket bag portion and the inside of the upper panel in order to make stable the configuration of the recessed type pocket. It is preferable to use a strap to implement the aforesaid fixation. FIG. 7 is a perspective view of an example of an air hat in which a pocket opening 62 is formed into a longitudinal slit-like configuration when the air bag is inflated to the full extent and in which a recessed type pocket bag portion 61 is fixedly sewed to the inside of an upper panel of the air bag via a strap 63. The pocket can be produced by fixedly sewing the pocket bag portion 61 provided with the strap 63 to the inside of the upper panel of the air bag, forming the slit-like opening 62 in the lower panel of the air bag and sewing together the mouth portion of the slit-like opening 62 and the mouth portion of the pocket bag portion 61.

It is preferable that the strap 63 is sewed to a bottom portion of the recessed type pocket bag portion 61 at one end thereof, and at the other end thereof in the vicinity of the pocket, it is preferred that the strap be sewn to the inside of the upper panel of the air bag.

While it is preferable that the pocket becomes recessed when the air bag is inflated, the pocket may become protruded when the air bag is inflated. As has been described before, the pocket is accommodated in the state in which it is contained inside the air bag in the state in which the air bag is folded up in the retainer. Consequently, the air bag in which the pocket becomes protruded is an air bag in which the pocket accommodated in the interior of the air bag is reversed to become protruded when the air bag is inflated, in case there exists no obstacle. However, in case a child safety seat, for example, is placed facing rearward in the front passenger seat, since the air bag is brought into contact with the top portion of the child safety seat in the inflating process before the pocket is protruded, the pocket is thereby be forced into the air bag, and the air bag can be inflated while the impact to the child safety seat is minimized.

Figure 8:
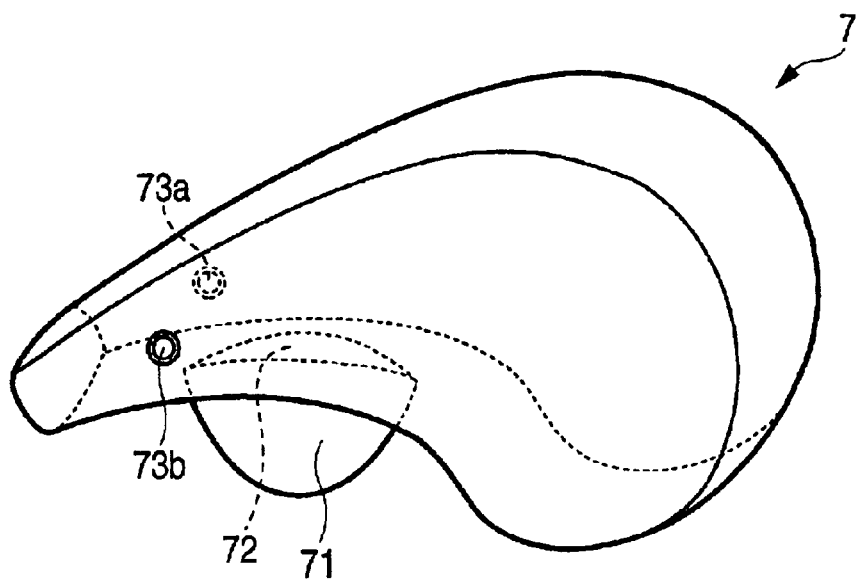
FIG. 8 is a perspective view showing an air bag according to another modified embodiment of the invention.

FIG. 8 is a perspective view showing an example of an air bag in which a protruded type pocket is formed in the air bag when it is inflated. The pocket of the air bag 7 comprises a pocket opening 72 which is formed into a longitudinal slit-like configuration relative to a direction in which the air bag is inflated and a pocket bag portion 71 which is constructed by sewing together two angled panels. The pocket can be produced by forming the slit-like opening 72 in the lower panel of the air bag and sewing together the mouth of the slit-like opening 72 and the mouth portion of the pocket bag portion 71.

It is preferable to form a vent hole (an exhaust hole) even in the air, bag in which the protruded type pocket is formed as the impact resulting when the top portion of the child safety seat is accommodated in the air bag can be relaxed quickly.

Note that whiles the embodiments of the invention have been described with the child safety seat being placed to face rearward as an obstacle, the invention is not limited thereto. According to the invention, even in case the child stands near the instrument panel, the air bag can be inflated while reducing the impact to the child.

Thus, while the air bag system according to the invention has been described with reference to the appended drawings, the invention is not limited thereto, and various modifications can be made to the air bag system without departing from the spirit and scope of the invention.

As has been described in detail, with the air bag system according to the invention, since the pocket is formed in the lower surface of the air bag when it is inflated, even if an obstacle exists near the instrument panel, the obstacle can be received in the pocket, and therefore the air bag can be inflated to the desired inflating configuration to thereby restrain the passenger as designed, and the impact to the obstacle can also be reduced. In addition, even if there exists no obstacle, the designed passenger restraining performance can be maintained. The air bag system according to the invention may preferably be used as a front passenger air bag system.

What is claimed is:

1. An air bag system comprising:
   an air bag for placement in a folded state under an upper surface of an instrument panel of a vehicle, and for being inflated by an inflator when the vehicle is crashed,
   wherein the air bag has a pocket for extending inwardly inside of the air bag at a lower surface of the air bag when the air bag is fully inflated, and
   wherein the pocket has an opening portion disposed at the lower surface of the air bag.

2. The air bag system according to claim 1, wherein the pocket is located in a position corresponding to a top portion of a child safety seat when the air bag is inflated.

3. The air bag system according to claim 1, wherein the pocket is located in a position corresponding to a top portion of a child safety seat mounted on an occupant seat while facing rearward of the vehicle when the air bag is inflated.

4. The air bag system according to claim 1, wherein the air bag further comprises an exhaust hole located in the vicinity of the pocket for exhausting a gas.

5. The air bag system according to claim 1, wherein the pocket is housed inside of the air bag when the air bag is in said folded state.

6. The air bag system according to claim 1, wherein the pocket is recessed from the lower surface of the air bag, and wherein the pocket comprises:
   a pocket bag portion having a predetermined depth when the air bag is inflated;
   a pocket opening portion for receiving a top of a child safety seat, said pocket opening portion having a predetermined opening area; and
   a strap connecting an inside of an upper surface of the air bag with a bottom of the pocket bag portion.

7. The air bag system according to claim 6, wherein the depth of the pocket bag portion is between 5 cm and 30 cm.

8. The air bag system according to claim 6, wherein the opening area of the pocket opening portion is in the range from 450 to 900 $cm^2$.

9. The air bag system according to claim 6, wherein the strap is sewed to the bottom of the pocket bag portion at one and thereof and to the inside of the upper surface of the air bag at the other end thereof.

10. The air bag system according to claim 6, wherein the pocket opening portion is formed in one of a slit shape, a circular shape, a rectangular shape and an oval shape.

11. The air bag system according to claim 1, wherein the pocket is formed in a conical shape.

12. The air bag system according to claim 1, wherein the pocket is formed in a semi-oval shape.

13. The air bag system according to claim 1, wherein the pocket is formed in a cylindrical shape with a circular bottom opposing a pocket opening portion.

14. The air bag system according to claim 1, wherein the pocket is convexed from the lower surface of the air bag.

15. An air bag for placement in a folded state under an upper surface of an instrument panel of a vehicle, and for being inflated by an inflator when the vehicle is crashed, wherein the air bag is constructed and arranged to have a pocket formed in a lower surface thereof when the air bag is fully inflated, the pocket comprising:

a pocket bag portion having a predetermined depth when the air bag is inflated;

a pocket opening portion for receiving an obstacle therein, said pocket opening portion having a predetermined opening area and being disposed at the lower surface of the air bag; and a strap connecting an inside of an upper surface of the air bag with the pocket bag portion.

16. The air bag of claim 15, wherein the air bag further comprises an exhaust hole located in the vicinity of the pocket for exhausting a gas.

17. The air bag of claim 15, wherein the pocket is located in a position corresponding to a top portion of a child safety seat when the air bag is inflated.

18. The air bag system according to claim 1, wherein the pocket includes a pocket opening portion for receiving an obstacle therein, said pocket opening portion having a predetermined opening area.

19. The air bag of claim 15, wherein the pocket extends inwardly inside of the air bag at a lower surface of the air bag when the air bag is fully inflated.

20. The air bag system according to claim 15, wherein the pocket opening portion is formed in one of a slit shape, a circular shape, a rectangular shape and an oval shape.

21. An air bag system comprising:

an air bag for placement in a folded state under an upper surface of an instrument panel of a vehicle, and for being inflated by an inflator when the vehicle is crashed, wherein the air bag has an outer surface and a pocket provided for extending inwardly inside of the air bag at a lower portion of the air bag's outer surface when the air bag is fully inflated, and wherein the pocket comprises an opening portion disposed at the lower portion of the air bag's outer surface, and a body portion having sidewalls for extending inwardly from the opening portion in a fully inflated configuration of the airbag, such that the sidewalls are spaced apart and distinct from the outer surface of the air bag.

22. The air bag system of claim 21, wherein the sidewalls of the pocket form a closed shape such that a cross section of the sidewalls provides a closed section, and the closed section is spaced apart from the outer surface of the air bag.

\* \* \* \* \*

UNITED STATES PATENT AND TRADEMARK OFFICE
CERTIFICATE OF CORRECTION

PATENT NO. : 6,846,008 B2
DATED : January 25, 2005
INVENTOR(S) : Kamiji et al.

It is certified that error appears in the above-identified patent and that said Letters Patent is hereby corrected as shown below:

Column 1,
Line 43, change "passenger rest_raining" to -- passenger restraining --;
Line 52, change "which may eliminates" to -- which may eliminate --.

Column 2
Line 5, change "the location of atop portion" to -- the location of a top portion --;
Line 43, change "in detail be low" to -- in detail below --;
Line 52, change "container-like retainer which" to -- container-like retainer 12 which --.

Column 5,
Line 15, change "example of an air hat" to -- example of an air bag --.
Line 45, change "the pocket is thereby be forced" to -- the pocket is thereby forced --;
Line 60, change "in the air, bag" to -- in the air bag --;
Line 64, change "note that whiles the" to -- note that while the --.

Column 8
Line 23, change "ration of the airbag" to -- ration of the air bag --;
Line 24, change "apart and distinet" to -- apart and distinct --.

Signed and Sealed this

Seventeenth Day of May, 2005

JON W. DUDAS
*Director of the United States Patent and Trademark Office*